A. BEAN.
Car Brake.
No. 27,344.
Patented Mar. 6, 1860.
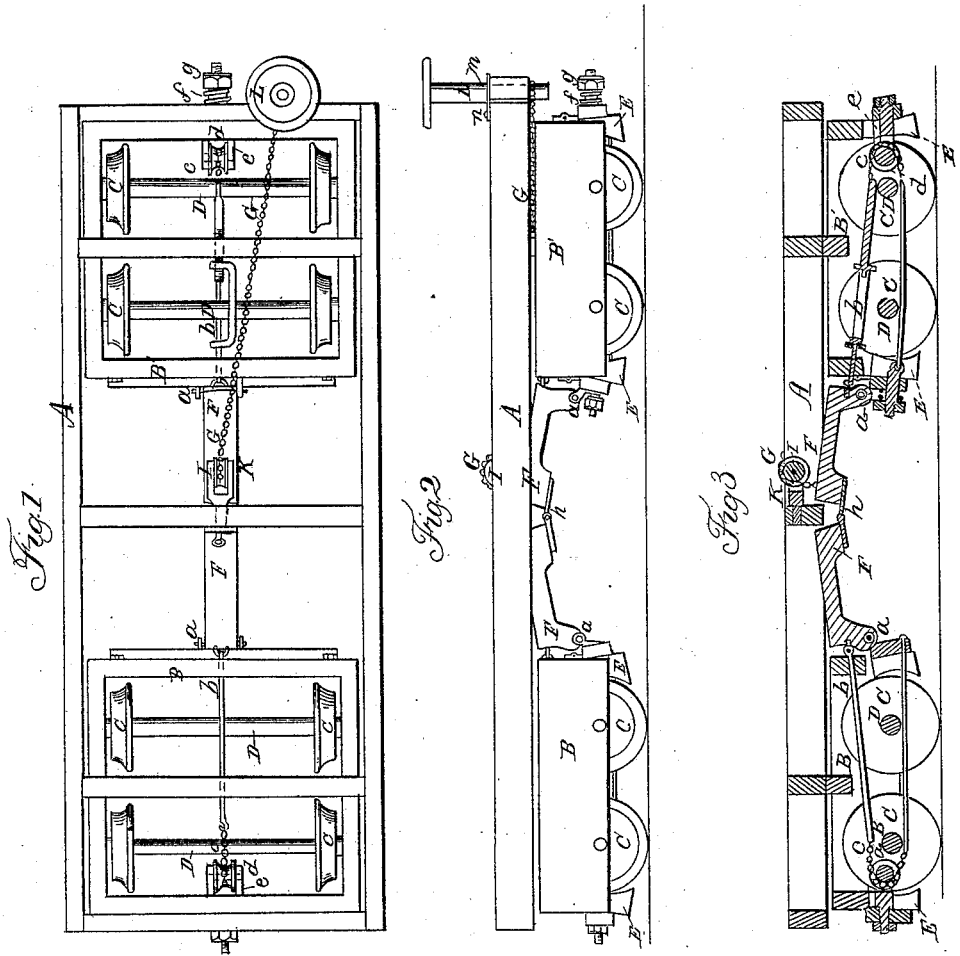
Witnesses:
R. H. Eddy
J. P. Hale Jr.
Inventor:
Albion Bean

UNITED STATES PATENT OFFICE.

ALBION BEAN, OF DEDHAM, MASSACHUSETTS.

RAILROAD-CAR BRAKE.

Specification of Letters Patent No. 27,344, dated March 6, 1860.

*To all whom it may concern:*

Be it known that I, ALBION BEAN, of Dedham, in the county of Norfolk and State of Massachusetts, have invented an Improved Brake Mechanism for Railway-Carriages; and I do hereby declare the same to be fully described and represented in the following specification and the accompanying drawings, of which—

Figure 1, is a top view; Fig. 2, a side elevation, and Fig. 3, a vertical and longitudinal section of a railway carriage platform frame and trucks furnished with my invention, the nature of which consists in an arrangement and application of a lever weight with respect to the truck frame, the brakes and hand windlass. Also, in so connecting the lever weights of both trucks that both may be raised simultaneously by one windlass and its chain. The object or purpose of such lever weight in the application and arrangement of it as specified is to enable a brakeman to operate the brakes with great facility and advantage.

In the drawings, A, exhibits the platform frame, while B, B', are the two truck frames of an eight wheel car, they being arranged with regard to one another as shown in the drawings, that is, in the usual manner. Each truck frame should be applied to the platform frame so as to swivel under it, and should be supported on the railway track by four wheels C, C, C, C, the axles of which are exhibited at D.

The pair of wheels at each end of the truck frame has a brake E, provided with rubbers and hung to the truck frame in the usual manner.

To the inner brake of each truck frame, a heavy weight F, made in the form of a bent lever is connected by a hinge joint, $a$, arranged at the lower end of its shorter arm such being so made as to allow the weight, F, to move in a vertical direction. The said weight, F, at its heel or angle is also hinged to one end of a rod or chain connection, $b$, from which a chain, $c$, is carried through the truck frame and around a sheave, $d$, carried by a fork, $e$, which extends through the outer brake bar and receives a spring, $f$, and a nut, $g$, arranged as shown in the drawings. After passing about the sheave, the chain is connected with the inner brake as shown in the drawings.

The two weights F, F', are hinged together as seen at, $h$, in Fig. 3, and from the inner end of one or from that of each of them, a chain, G, may be led upward and around a guide sheave I, supported by a fork, K, sustained by the platform frame. From thence, the chain should be led to a hand windlass L, applied to the end of the platform and provided with a ratchet, $m$, and holding pawl, $n$, in the usual manner.

When the lever weight, F, of each truck is suffered to fall, it will not only push one brake toward the wheels thereof, but will draw the other brake against its wheels and with a powerful leverage, for the lever weight may be so heavy as to exert a much greater force on the brakes than a brakeman can by the windlass and ordinary system of levers. Furthermore, the power to raise the weight and thus free the wheels from the pressure of the brakes is applied to the weight F, and simply has to raise such and as it is applied to or near to the extremity of the longer arm of the lever weight, it can accomplish the elevation of the weight with great facility. The object of the spring, $f$, is to enable the brake rubbers to properly accommodate themselves to the peripheries of both of the wheels so as to bear equally upon them however such may be worn.

From the above, it will be seen that in order to insure the brakes to be put in action upon the wheels suddenly and with great power, a brakeman has only to move the pawl out of the ratchet of the hand windlass, which having been done, gravity will accomplish the rest.

I am aware that the brakes of the truck of a car have been operated by the uncoiling of a strong spiral spring. I do not claim such as the arrangement and mode of adaptation of such have been very different from those of the lever weight or weights of my invention; but—

1. I claim the arrangement and application of the lever weight with respect to the truck frame, the brakes and the hand windlass substantially in manner and to operate as described.

2. I also claim so connecting the two lever weights of the two adjacent truck frames, that both may be raised by one chain or its equivalent, applied to either as set forth.

ALBION BEAN.

Witnesses:
R. H. EDDY,
F. P. HALE, Jr.